United States Patent
Wilkinson et al.

Patent Number: 5,149,437
Date of Patent: Sep. 22, 1992

[54] WATER FILTER

[76] Inventors: Theodore L. Wilkinson, 126 Warwickshire La., Glen Burnie, Md. 21061; Frank J. Sork, 612 Dunberry Dr., Arnold, Md. 21012

[21] Appl. No.: 676,698

[22] Filed: Mar. 29, 1991

[51] Int. Cl.$^5$ .............. C02F 1/70; C02F 1/72; C02F 1/42

[52] U.S. Cl. .................. 210/665; 210/668; 210/669; 210/719; 210/721; 210/757; 210/758; 210/282; 210/283; 210/284; 210/290

[58] Field of Search .......... 210/669, 668, 667, 757, 210/758, 206, 264, 266, 283, 284, 290, 502.1, 501, 503, 282, 665, 702, 719, 721

[56] References Cited

U.S. PATENT DOCUMENTS

| | | | |
|---|---|---|---|
| 3,327,859 | 6/1967 | Pall | 210/282 |
| 3,554,377 | 1/1971 | Miller | 210/283 |
| 4,196,081 | 4/1980 | Pavia | 210/283 |
| 4,368,123 | 1/1983 | Stanley | 210/282 |
| 4,642,192 | 2/1987 | Heskett | 210/763 |
| 4,851,122 | 7/1989 | Stanley | 210/502.1 |

Primary Examiner—Stanley S. Silverman
Assistant Examiner—Cynthia L. Nessler

[57] ABSTRACT

An improved filter device is provided for removing contaminants from water comprising a filter housing having an inlet at one end for water to be purified and an oulet for purified water at an opposing end, said filter device including in sequence first, second and third layers of purification material, a first layer of purification material comprising metallic particles which establish a suitable redox potential in the first layer, a second layer of purification material comprising activated carbon, and a third layer of purification material comprising a weak acid ion exchange resin.

19 Claims, 1 Drawing Sheet

WATER FILTER

BACKGROUND OF THE INVENTION

The present invention is directed to an improved filter for removing contaminants from water.

Over the years, many attempts have been made to provide an effective system for the removal of contaminants from aqueous systems to provide safe drinking water for human consumption.

Such contaminants include organic compounds such as trihalomethanes (e.g., chloroform), as well as inorganic contaminants such as arsenic, cadmium, lead, copper, mercury, chromium and selenium.

Drinking water may also contain various microorganisms such as bacteria, virus, algae, fungus, and protozoa, as well as finely divided and suspended particles derived from soil, silt and inorganic fibers such as asbestos fibers.

For example, ion exchange systems have been employed which employ ion exchange resins such as cation exchange resins to reduce water hardness by exchanging calcium and magnesium for sodium. Chlorine has been found to reduce the effectiveness of such resin materials.

Reverse osmosis has also been employed to remove contaminants by the combined action of osmotic pressure and a selective membrane material. Chlorine frequently is found to have a deleterious effect on such membranes.

Activated carbon has recently achieved much popularity in domestic water purification systems, yet it experiences many drawbacks due to its failure to remove a wide range of contaminants from the water as well as its tendency to quickly become relatively ineffective and/or become contaminated with bacteria.

Combinations of the above systems have also been contemplated.

U.S. Pat. Nos. 4,199,449; 4,759,844; 4,196,081; 4,913,808; 4,826,594; 4,894,154; and 4,430,226 each disclose the combination of an activated carbon material and an ion exchange resin in water purifiers.

U.S. Pat. No. 3,444,079 discloses the combination of a cation exchange resin and activated carbon for demineralizing water.

U.S. Pat. No. 4,561,976 discloses the use of silver-impregnated activated carbon and an anion exchange resin in a water filter.

U.S. Pat. No 4,561,976 discloses the use of three materials in a water purifier consisting of a molecular sieve such as a silicalite, an anion exchange resin and activated carbon (as the last layer).

U.S. Pat. Nos. 4,913,808; 4,430,226; and 4,368,123 disclose the use of admixtures of anion and cation exchange resins in water filters in combination with a bed of activated carbon.

U.S. Pat. No. 4,741,828 discloses the use of silver-impregnated activated carbon as a bactero-statically effective material in water filters.

However, the search has continued in the water purification industry to provide a water purification device which exhibits long life while effectively removing both organic and metallic contaminants from the water.

OBJECTS AND SUMMARY OF THE INVENTION

It is one object of the present invention to provide a water filter which exhibits a long useful life.

It is another object of the present invention to provide a water filter which removes a wide range of contaminants from water.

It is another object of the present invention to provide a water filter which effectively removes organic contaminants from water.

It is another object of the present invention to provide a water filter which effectively removes metallic contaminants from water.

It is yet another object of the present invention to provide a method for the purification of water which effectively and efficiently removes a wide variety of contaminants from the water.

In accordance with the present invention, there is thus provided a method for the purification of water which comprises sequentially contacting water with first, second and third water purification materials, said first purification material comprising metallic particles which establish a suitable redox potential with respect to water contaminants, said second purification material comprising activated carbon, and said third purification material comprising a weak acid ion exchange resin.

In accordance with the present invention, there is also provided an improved water filter for removing inorganic or organic contaminants from water comprising:

a filter device including in sequence first, second and third layers of water purification material, said first layer of purification material comprising metallic particles which establish a suitable redox potential in the first layer, said second layer of purification material comprising activated carbon, and said third layer of purification material comprising a weak acid ion exchange resin.

DETAILED DESCRIPTION OF THE PRESENT INVENTION

The present invention is directed to a water purification apparatus which exhibits both a long useful life and effectively removes a wide range of contaminants from water. The present invention involves the use of three water purification materials in series which results in purified water being obtained.

The water filter apparatus of the present invention will be described in conjunction with the Figures.

Figure 1:
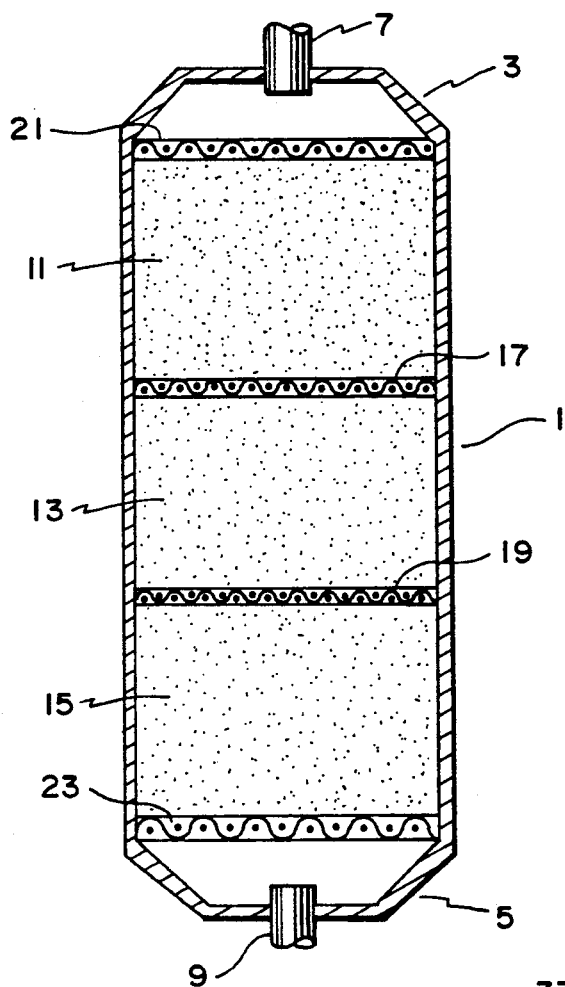
FIG. 1 is a sectional view of a water filter in accordance with one embodiment of the present invention.

Specifically, in the embodiment depicted in FIG. 1, a filter device is depicted comprised of an elongate fluid tight filter housing 1 having an inlet end 3 and an outlet end 5. The inlet end includes an inlet means 7 such as an opening in the end of the filter housing configured to permit attachment to a source of water to be purified whereby the water to be purified may pass into and through the interior of the housing.

The filter housing also includes an outlet means 9 such as an opening in an opposing end of the filter housing configured to permit removal and recovery of purified water from the filter housing.

With regard to the purification materials contained within the filter housing, the filter device includes in sequence from said inlet 7 to said outlet 9 of said filter housing first, second and third layers of purification materials 11, 13 and 15, respectively.

The first layer of purification material comprises metallic oxidation/reduction particles, the second layer of purification material comprises activated carbon, and the third layer of purification material comprises a weak acid ion exchange resin.

The first layer of purification material functions primarily to remove metallic impurities, halogenated organic impurities and other impurities such as bacteria, hydrogen sulfide, chlorine, nitrates from the inlet stream.

More specifically, this first layer comprises a medium having a redox potential that favors spontaneous oxidation-reduction reactions between the medium and the undesirable contaminants to be treated, whereby the contaminant is converted to a less harmful insoluble precipitate or soluble compound.

For instance, the first purification material may comprise metallic particles comprised of aluminum, copper, zinc, steel, iron and mixtures or alloys thereof. Exemplary alloys of such metals include alloys of copper and zinc in a ratio of 50/50 or 85/15 to yield brass particles and mixtures of same.

The first layer is comprised of particles of two dissimilar metals or alloys of metals which dissimilar metals exhibit first and second redox potentials such that conditions are established during contact with the water that result in spontaneous oxidation and reduction reactions between the contaminant(s) and the metal particles.

Advantageously, the first layer of purification material inhibits growth of algae, fungi, and bacteria, removes chlorine added as a disinfectant, removes hydrogen sulfide, iron and other heavy metals such as cadmium and lead, reduces water hardness, and exhibits a long useful life.

Preferably, such particles comprise copper as one metal, and another metal having a suitable redox potential which enables the desired results to be achieved. Suitable second metal particles or alloy components with copper include zinc and aluminum. Alternatively, zinc and iron may be used in combination. Other combinations are also suitable and may be determined by one skilled in the art. Copper and zinc are preferred since each acts as an effective reducing agent with respect to common inorganic contaminants and can be tolerated in solution in small amounts without adverse side effect.

When using the combination of copper and zinc, an impurity such as hydrogen sulfide is converted to cupric sulfide, iron oxide is converted to ferric oxide, and chlorine is converted to zinc chloride.

Such materials have also been found to inhibit the growth of bacteria which may be retained in the bed of particles during treatment of water.

The first purification material is disclosed and discussed at length in U.S. Pat. No. 4,642,192 of Heskett, herein incorporated by reference in its entirety.

Such material is available commercially from ORC/KDF Technologies, Inc. of Constantine, Michigan, under the designation KDF, and comprises copper/zinc particles or copper/zinc alloy particles.

The second layer of purification material 13 comprises activated carbon which preferably is impregnated with a bacterio-statically effective compound such as silver.

The activated carbon functions in the filter device primarily to remove any volatile hydrocarbons which remain in the water subsequent to contact of the water with the first purification material. The activated carbon material also assists in removing disagreeable odors from the water as well as improving taste by removing impurities. This material is well-known to those skilled in the art and readily available for use in practice of the present invention.

The third purification material 15 comprises a weak acid cation exchange resin, which serves primarily to remove inorganic impurities such as copper and lead ions which remain in the water.

Such resins are well-known to those skilled in the art, and are discussed at length in the literature. For instance, the term "weak" or "strong" refer to a particular resin's degree of ionization (or dissociation into ions). A strong resin is a highly ionized resin, while a weak resin is a weakly ionized resin.

The strength of a resin can be determined by titration. Titration measures the change in pH value while a suspension of the ion exchange resin is neutralized through the addition of an alkali or an acid, as appropriate. In a strong acid cation resin, the pH value starts at about 1 and, as alkali is added, increases to about 12. By contrast, when the weak acid cation resin is similarly neutralized, the pH value starts at about 3 and requires much more alkali to reach a value of 12.

Exemplary weak acid cation resins include but are not limited to carboxylic resins. Macroporous resins are preferred because of physical stability but are not required.

Weak acid cation resins which are suitable for use in the present invention are available from Sybron Chemicals Inc. of Birmingham, New Jersey under the designation IONAC. Such resins are described in the literature as being weakly acidic, acrylic divinylbenzene carboxylic cation exchange resins.

As discussed earlier, it has been discovered that the above three purification materials must be present in the filter device in the stated order. That is, the water to be purified contacts the respective purification materials in the order depicted in FIG. 1, with the water to be purified first contacting the first purification material, followed in sequence by contact with the second and third materials.

Advantageously, the first purification material removes heavy metals and halogenated organic compounds prior to the partially-treated water contacting the activated carbon material which would otherwise be prone to rapid saturation with such compounds and resulting deactivation. Instead, the activated carbon material can focus upon the removal of organic contaminants which remain in the water after having been initially treated with the first purification material. This not only enhances the effectiveness of the activated carbon material but serves to lengthen its useful life.

By the time the partially treated water reaches the third purification material, the majority of the remaining impurities comprise only residual metallic impurities such as copper and lead ions, if any, as well as any contaminants which may have leached from the first two materials. The cation exchange resin, due to the prior removal of the majority of the deleterious components in the water, is able to efficiently attend to the removal of such harmful impurities which may remain in the water as well as any impurities present which leached from the preceding treatment materials.

While not necessary, the respective layers of purification material in the filter housing may be separated by foraminous barriers 17, 19 which serve to segregate the separate layers of purification materials. While such segregation is not required, it serves to enhance the ease of removal of the materials from the filter device in the event the materials are to be separately replaced or regenerated.

Advantageously, a foraminous barrier 21, 23 is placed at the ends of the filter housing to retain the purification materials within the housing and prevent their escape together with treated water.

While not required, it may also be an advantage to pass the water through a sediment filter prior to treatment in the filter housing to prevent large particles from clogging the beds of purification material.

In the embodiment of FIG. 1, purification materials 11, 13, 15 may each be present in equal volume amounts, although the respective amounts may be tailored as necessary to the type of contaminants present in the water.

Figure 2:
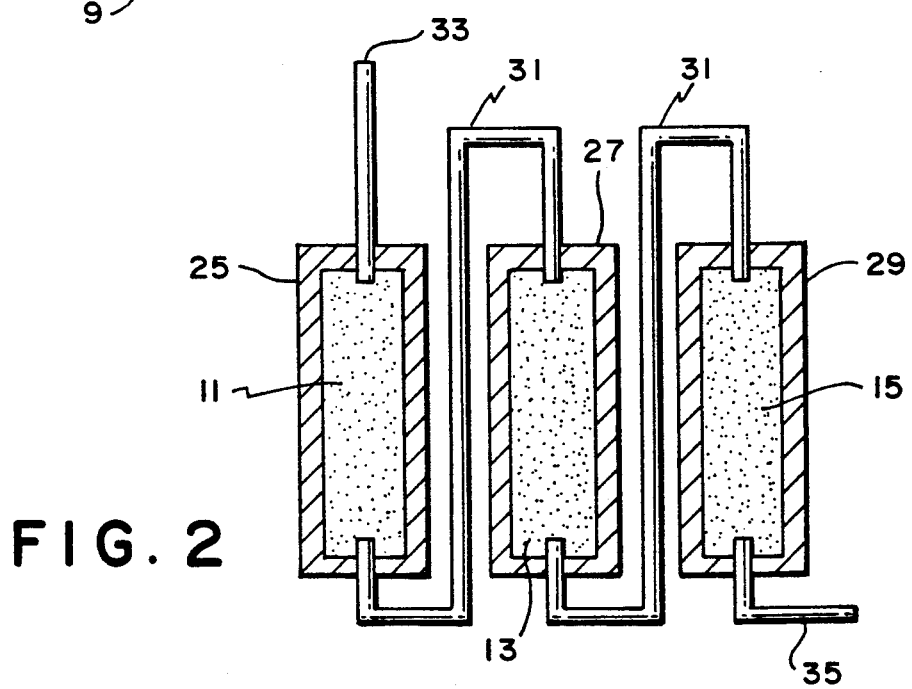
FIG. 2 is a sectional view of a water filter in accordance with a second embodiment of the present invention.

In the embodiment of FIG. 2, the three purification materials are still employed in series in the required order of contact with the water but are instead contained in separate filter housings which are connected in series to each other.

Specifically, purification materials 11, 13, 15 are separately contained in filter housings 25, 27, 29. The filter housings 25, 27, 29 are connected in series by pipe means 31, with inlet pipe means 33 feeding impure water to the first filter housing 25 and outlet pipe means 35 removing purified water from the last filter housing 29 in the series. Such an embodiment of sequential filter housings is, of course, known as disclosed by U.S. Pat. No. 4,474,620 (albeit using different treatment materials).

The choice of the FIG. 1 or 2 design depends to a great extent upon the type of end use contemplated for the filter device. That is, when used to purify drinking fountain water as part of a drinking fountain plumbing scheme, the unitary filter device of FIG. 1 will generally be employed due to space-saving considerations.

Alternatively, in an industrial environment where factors such as space are not critical but which requires treatment of large volumes of water, the embodiment of FIG. 2 may be employed with advantage since separate high volume canisters of the respective purification materials can be employed to ensure the ability to treat a large throughput of water while also retaining the ability to regenerate or replace each canister separately as required.

In any event, irrespective of whether the embodiment of FIG. 1 or FIG. 2 is employed, the advantages of the present invention may still be attained.

The respective layers of purification materials are preferably used in particulate form of a size which limits the ability of the materials to be removed from the filter device together with the water passing through the device.

By way of specific embodiment, a suitably-sized unitary filter housing such as depicted in FIG. 1 would typically be 2 inches by 6 inches in dimension and have an expected useful life of from 6,000 to 19,000 gallons depending upon the flow rate of the water to be purified. For instance, at a flow rate of 0.5 GPM, a useful life of 6,000 gallons would be expected, while at a flow rate of approximately 2 GRM, a useful life of 19,000 gallons could be expected. Such estimates are based on equal volume amounts of "KDF" (227 grams), activated carbon (90 grams) and weak acid ion exchange resin 90 (grams) being present in the filter housing.

EXAMPLE

A water filter is constructed in accordance with the present invention comprising in sequence "KDF" particles, silver-impregnated activated carbon, and a weak acid ion exchange resin, with the noted materials each occupying approximately one-third of the internal volume of the filter.

The filter efficiency was tested in accordance with NSF Standard 53 which specifies the methodology for determining the reduction efficiency and capacities of point-of-use water treatment devices in relation to the resulting health benefits. The test standards stipulate that the filter is tested under conditions which simulate actual usage of the filter. The tested filter was tested on a 50/on and 50/off time cycles, for 16 hours per day until the units reach 200 percent of rated capacity. The 8 hours of stagnation is provided to simulate overnight non-use of the filter, in addition to units operated under a constant inlet static pressure of 60 psig.

All tests were run with duplicate filters. The units are connected to a manifold which ensures that each unit receives the same water sample and the same pressure. For this test, the flow rate is controlled at 0.5 GPM for each of the filter units. NSF Standard 53 specifies that a general test water be used in testing the efficiency of all water filters. It is to this test water that various contaminants are added for the filter tests. This general test water is created by submicron filtration and activated carbon treatment of city of Chicago tap water. This specified water characteristics are as follows:

| Total dissolved solids | 200 to 500 mg/l |
| pH | 7.0 to 8.0 |
| Total Organic Carbon | >1.0 mg/l |
| Temperature | 63 to 73° F. |
| Turbidity | <1.0 NTU |

Standard 53 requires that samples of the test water influent and the treated water effluent from the filter cartridges be analyzed at specific intervals during the test sequence.

The life of the tested units was assumed to be 6000 gallons. Samples were therefore obtained at startup, 3000, 6000, 9000, 10,800, and 12,000 gallons (i.e., 50, 100, 150, 180 and 200% of capacity). Samples were collected at the beginning of the on cycle.

Exemplary efficacy data generated during the tests is as follows:

| Contaminant | Max. Allowed. | Influent | Effluent |
|---|---|---|---|
| TEST A (100% OF CAPACITY) | | | |
| Chloroform | <0.1 | 0.390 | 0.018 |
| Lead | <0.025 | 0.138 | 0.005 |
| Fluoride | <1.4 | 7.62 | 0.58 |
| Nitrate | <10.0 | 31.2 | 6.80 |
| Barium | <1.0 | 9.1 | 0.42 |
| Arsenic | <0.05 | 0.41 | 0.007 |
| Cadmium | <0.01 | 0.02 | 0.005 |
| Chromium VI | <0.05 | 0.13 | 0.008 |
| Chromium III | <0.05 | 0.168 | 0.004 |

-continued

| Contaminant | Max. Allowed | Influent | Effluent |
|---|---|---|---|
| Selenium | <0.01 | 0.09 | 0.007 |
| Mercury | <0.002 | 0.008 | <0.0005 |
| Endrin | <0.0002 | 0.0008 | <0.0002 |
| Lindane | <0.004 | 0.013 | 0.0014 |
| Methoxychlor | <0.1 | 0.12 | 0.008 |
| Toxaphene | <0.005 | 0.02 | <0.005 |
| 2,4-D | <0.1 | 0.19 | 0.017 |
| Silvex (2,4,5-TP) | <0.01 | 0.02 | 0.008 |
| TEST B (150% OF CAPACITY) | | | |
| Chloroform | <0.1 | 0.440 | 0.042 |
| Lead | <0.025 | 0.141 | 0.005 |
| Fluoride | <1.4 | 7.82 | 0.72 |
| Nitrate | <10.0 | 27.8 | 9.48 |
| Barium | <1.0 | 8.7 | 0.88 |
| Arsenic | <0.05 | 0.25 | 0.011 |
| Cadmium | <0.01 | 0.03 | 0.009 |
| Chromium VI | <0.05 | 0.14 | 0.024 |
| Chromium III | <0.05 | 0.162 | 0.013 |
| Selenium | <0.01 | 0.11 | 0.012 |
| Mercury | <0.002 | 0.005 | <0.0005 |
| Endrin | <0.0002 | 0.0006 | 0.0002 |
| Lindane | <0.004 | 0.015 | 0.002 |
| Methoxychlor | <0.1 | 0.34 | 0.031 |
| Toxaphene | <0.005 | 0.018 | <0.005 |
| 2,4-D | <0.1 | 0.24 | 0.028 |
| Silvex (2,4,5-TP) | <0.01 | 0.016 | 0.008 |

The above tests confirm the ability of the water filter of the present invention to remove a wide variety of contaminants from water over an extended period of time, and even at 150% of capacity.

It will be appreciated by those skilled in the art that many modifications and variations may be made without departing from the spirit and scope of the present invention.

What is claimed is:

1. A filter device for removing contaminants from water comprising:
   inlet means for water to be treated and an outlet means for treater water,
   first, second and third water purification materials in sequence from said inlet means to said outlet means,
   said first purification material comprising a bed of particles of dissimilar metals having first and second redox potentials such that conditions are established in the bed for spontaneous oxidation and reduction reactions between contaminants present in the water and said metal particles upon contact of said water with said first material,
   said second purification material comprising activated carbon, and
   said third purification material comprising a weak acid cation exchange resin.

2. The filter device of claim 1 wherein said first material comprises particles of copper and a second dissimilar metal.

3. The filter device of claim 2 wherein said first material comprises particles of copper and zinc.

4. The filter device of claim 1 wherein said dissimilar metals are present in the form of an alloy.

5. The filter device of claim 4 wherein said alloy comprises an alloy of copper and zinc.

6. The filter device of claim 5 wherein said alloy comprises copper and zinc in the ratio of approximately 50:50 to 85:15.

7. The filter device of claim 1 wherein said first, second and third materials are employed in approximately equal volumes in said filter device.

8. The filter device of claim 1 further comprising a sediment filter layer preceding said first purification material.

9. The filter device of claim wherein said second purification material comprises silver-treated activated carbon.

10. The filter device of claim 1 wherein said filter device comprises a unitary filter housing which contains said first, second and third as distinct separate layers of purification materials.

11. The filter device of claim 10 further comprising foraminous dividers positioned between said layers of purification material.

12. The filter device of claim 1 wherein said filter device comprises at least three distinct filter housings each containing one of said purification materials.

13. A method for the purification of water which comprises sequentially contacting water with first, second and third layers of water purification materials,
   said first layer of purification material comprising a bed of particles of dissimilar metals having first and second redox potentials such that conditions are established in said bed for spontaneous oxidation and reduction reactions between contaminants present in the water and said metal particles upon contact of said water with said first material,
   said second layer of purification material comprising activated carbon, and
   said third layer of purification material comprising a weak acid cation exchange resin, and
   recovering purified water subsequent to contacting said first, second and third layers.

14. The method of claim 13 wherein said first layer comprises particles comprised of copper and a second dissimilar metal.

15. The method of claim 14 wherein said first layer comprises particles of copper and zinc.

16. The method of claim 13 wherein said dissimilar metals are present in the form of an alloy.

17. The method of claim 16 wherein said alloy comprises an alloy of copper and zinc.

18. The method of claim 17 wherein said alloy comprises copper and zinc in the ratio of approximately 50:50 to 85:15.

19. The method of claim 13 wherein said second purification material comprises silver-treated activated carbon.

* * * * *